US010457562B2

(12) United States Patent
Vreugdenhil et al.

(10) Patent No.: US 10,457,562 B2
(45) Date of Patent: Oct. 29, 2019

(54) ANTI-CORROSION SOL-GEL MATERIAL (71) Applicant: TRENT UNIVERSITY, Peterborough (CA)

(72) Inventors: Andrew James Vreugdenhil, Peterborough (CA); Theresa Elizabeth Stotesbury, Ayr (CA)

(73) Assignee: Trent University, Peterborough, Ontario (CA)

( * ) Notice: Subject to any disclaimer, the term of this patent is extended or adjusted under 35 U.S.C. 154(b) by 0 days.

(21) Appl. No.: 15/558,007

(22) PCT Filed: Mar. 15, 2016

(86) PCT No.: PCT/CA2016/050287
§ 371 (c)(1),
(2) Date: Sep. 13, 2017

(87) PCT Pub. No.: WO2016/154736
PCT Pub. Date: Oct. 6, 2016

(65) Prior Publication Data
US 2019/0248660 A1    Aug. 15, 2019

Related U.S. Application Data (60) Provisional application No. 62/139,107, filed on Mar. 27, 2015.

(51) Int. Cl.
C08L 83/06    (2006.01)
C01B 33/145   (2006.01)
(Continued)

(52) U.S. Cl.
CPC .......... *C01B 33/145* (2013.01); *C08G 77/14* (2013.01); *C08G 77/28* (2013.01); *C08L 83/06* (2013.01);
(Continued)

(58) Field of Classification Search
None
See application file for complete search history.

(56) References Cited

U.S. PATENT DOCUMENTS 8,540,814 B2    9/2013  Vreugdenhil et al.
2004/0039094 A1*  2/2004  Taylor .................. C08F 290/14
                                              524/261
(Continued)

FOREIGN PATENT DOCUMENTS

CA    2689947        4/2010
WO    WO2012080544   6/2012
WO    WO2015017985   2/2015

OTHER PUBLICATIONS

Peng, Shusen; Zeng, Zhixiang; Zhao, Wenjie; Li, He; Xue,Qunji; Wu, Xuedong. Synergistic effect of thiourea in epoxy functionalized silica sol-gel coating for copper protection. Surface & Coatings Technology. 213:175-182, 2012.
(Continued)

*Primary Examiner* — Robert S Loewe
(74) *Attorney, Agent, or Firm* — Bereskin & Parr LLP/S.E.N.C.R.L.; Michael Fenwick (57) ABSTRACT The present disclosure relates to anti-corrosion sol-gel material. In particular, the disclosure relates to a cross-linked sol-gel material comprising a first colloidal sol gel made from silanols having an epoxy functionality and a second colloidal sol gel made from silanols having a thiol functionality.

20 Claims, 6 Drawing Sheets (51) Int. Cl.
*C08G 77/14* (2006.01)
*C08G 77/28* (2006.01)
*C09D 5/08* (2006.01)
*C09D 183/06* (2006.01)

(52) U.S. Cl.
CPC ............. *C09D 5/08* (2013.01); *C09D 183/06* (2013.01); *C08G 2220/00* (2013.01); *C08L 2312/00* (2013.01)

(56) References Cited

U.S. PATENT DOCUMENTS

| | | | | |
|---|---|---|---|---|
| 2011/0003142 A1* | 1/2011 | Asuka | ...................... | C09D 7/67 |
| | | | | 428/329 |
| 2014/0208982 A1* | 7/2014 | Asuka | ................... | B82Y 20/00 |
| | | | | 106/287.14 |
| 2014/0272420 A1 | 9/2014 | Mannari | | |
| 2015/0037563 A1 | 2/2015 | Bockmeyer et al. | | |

OTHER PUBLICATIONS

Dash, Chandrakanta; Shaikh, Mobin M.; Ghosh, Prasenjit. Fluoride-Free Hiyama and Copper- and Amine-Free Sonogashira Coupling in Air in a Mixed Aqueous Medium by a Series of PEPPSI-Themed Precatalysts. Eur. J. Inorg. Chem. 2009, 1608-1618.

Kremzow, Doris; Seidel, Gunter; Lehmann, Christian W.; Furstner, Alois. Diaminocarbene- and Fischer-Carbene Complexes of Palladium and Nickel by Oxidative Insertion: Preparation, Structure and Catalytic Activity. Chem. Eur. J. 11:1833-1853, 2005.

Organ, Michael G.; Abdel-Hadi, Mirvat; Avola, Stephanie; Hadei, Niloufar; Nasielski, Joanna;O'Brien, Christopher J.; Valente, Cory. Biaryls Made Easy: PEPPSI and the Kumada-Tamao-Corriu Reaction. Chem. Eur. J. 13:150-157, 2007.

* cited by examiner

ANTI-CORROSION SOL-GEL MATERIAL

RELATED APPLICATIONS

This is a national stage application of PCT/CA2016/050287, filed Mar. 15, 2016, which claims priority from U.S. Provisional patent application Ser. No. 62/139,107, filed Mar. 27, 2015, all of which are incorporated herein by reference in their entirety.

FIELD

The present disclosure relates to a sol-gel material. In particular, the present disclosure relates to an anti-corrosion sol-gel material comprising a cross-linked sol-gel material for application to substrates susceptible to corrosion.

INTRODUCTION

The sol-gel process is a well-known, versatile, water based process for making ceramic and glass materials. The process generally involves the transition of a system from a liquid "sol" (mostly colloidal) phase into a solid "gel" phase. As applied to silica materials, an aqueous solution of an organosilane such as tetramethoxysilane is formed which, by means of hydrolysis and condensation reactions, forms a new phase, a sol, made up of solid particles of a diameter of a few hundred nanometers suspended in the aqueous liquid phase. Further condensation of the particles forms another new phase, a gel, in which solid macromolecules are immersed in the liquid. Substrates may be dipped into or sprayed with the gel.

SUMMARY

The present disclosure relates to a sol-gel material. In one embodiment, the present disclosure relates to an anti-corrosion sol-gel material comprising a cross-linked sol-gel material. In one embodiment, the sol-gel material is for application to metal substrates.

In one embodiment, therefore, the present disclosure is directed to a sol-gel material, comprising:
a) a first colloidal sol-gel formed from:
  a.i) tetrasilanol, and
  a.ii) a trisilanol compound having an epoxy group;
b) a second colloidal sol-gel formed from:
  b.i) tetrasilanol, and
  b.ii) a trisilanol compound having a thiol group,
wherein the first colloidal sol-gel is cross-linked to the second colloidal sol-gel.

In one embodiment, the epoxy group and the thiol group react to cross-link the first colloidal sol-gel with the second colloidal sol-gel to form the sol-gel material. In one embodiment, the epoxy group and the thiol group spontaneously react to cross-link and form the sol-gel material. In one embodiment, the sol-gel material is coated on a substrate to form a thin film which prevents or reduces corrosion of the substrate. In one embodiment, the cross-linking reaction between the epoxy group and the thiol group to form the sol-gel material proceeds rapidly at ambient temperatures and avoids long curing times.

In one embodiment, the anti-corrosion sol-gel material is for application to corrosion susceptible substrates, such as metal substrates, for protecting the substrate against corrosion.

Other features and advantages of the present application will become apparent from the following detailed description. It should be understood, however, that the detailed description and the specific examples while indicating preferred embodiments of the application are given by way of illustration only, since various changes and modifications within the spirit and scope of the application will become apparent to those skilled in the art from this detailed description.

DRAWINGS

The disclosure will now be described in greater detail with reference to the following drawings in which.

DESCRIPTION OF VARIOUS EMBODIMENTS

(I) Definitions

The term "sol-gel" as used herein refers to colloidal siloxane products formed from a sol-gel process as a result of the hydrolysis and condensation of sol-gel precursors, such as alkoxy silane.

The term "colloidal", as used herein, refers to a fluid composition of microscopic siloxane nanoparticles suspended in a liquid medium.

The term "sol-gel material" as used herein refers to first and second sol-gels which are cross-linked as a result of reactive functionalities on the individual sol-gels.

The term "tetrasilanol" as used herein refers to a silane compound in which four hydroxyl substituents are bonded to a central silicon atom, $Si(OH)_4$.

The term "alkoxy silane" as used herein refers to a silane compound functionalized with four alkoxy substituents directly bonded to the silicon atom.

The term "halo silane" as used herein refers to a silane compound functionalized with four halo substituents directly bonded to the silicon atom.

The term "trisilanol compound having an epoxy group" as used herein refers to a silane compound functionalized with three hydroxy substituents directly bonded to the silicon atom, and another moiety bonded to the silicon atom carrying an epoxy functionality.

The term "trisilanol compound having a thiol group" as used herein refers to a silane compound functionalized with three hydroxy substituents directly bonded to the silicon atom, and another moiety bonded to the silicon atom carrying a thiol functionality.

The term "epoxy trisilanol precursor compound" as used herein refers to a silane compound having three substituents which are able to hydrolyze to hydroxy moieties under suitable conditions and another moiety bonded to the silicon atom carrying an epoxy functionality.

The term "thiol trisilanol precursor compound" as used herein refers to a silane compound having three substituents which are able to hydrolyze to hydroxy moieties under suitable conditions and another moiety bonded to the silicon atom carrying a thiol functionality.

The term "$(C_{1-n})$-alkyl" as used herein means straight and/or branched chain, saturated alkyl radicals containing from one to "n" carbon atoms and includes (depending on the identity of n) methyl, ethyl, propyl, isopropyl, n-butyl, s-butyl, isobutyl, t-butyl, 2,2-dimethylbutyl, n-pentyl, 2-methylpentyl, 3-methylpentyl, 4-methylpentyl, n-hexyl and the like, where the variable n is an integer representing the largest number of carbon atoms in the alkyl radical. The suffix "ene" added on to "alkyl" means that the group is divalent, i.e. inserted between two other groups.

The term "halo", as used herein, unless otherwise indicated, includes fluoro, chloro, bromo or iodo (II) Sol-Gel Material The present disclosure relates to a sol-gel material. In one embodiment, the present disclosure relates to a sol-gel material comprising a cross-linked sol-gel material. In another embodiment, the sol-gel material is a coating for application to corrosion susceptible substrates.

In one embodiment, therefore, the present disclosure includes a sol-gel material, comprising:
a) a first colloidal sol-gel formed from:
   a.i) tetrasilanol, and
   a.ii) a trisilanol compound having an epoxy group;
b) a second colloidal sol-gel formed from:
   b.i) tetrasilanol, and
   b.ii) a trisilanol compound having a thiol group,
wherein the first colloidal sol-gel is cross-linked to the second colloidal sol-gel.

In one embodiment, tetrasilanol has the formula

In one embodiment, the tetrasilanol is formed from a precursor compound which upon hydrolysis of the precursor compound produces tetrasilanol. In one embodiment, the tetrasilanol precursor compound is any compound which hydrolyzes to tetrasilanol under suitable conditions. In one embodiment, the tetrasilanol precursor compound comprises alkoxy and/or halo substituents which hydrolyze to hydroxyl moieties upon hydrolysis forming tetrasilanol.

In one embodiment, the tetrasilanol precursor compound has the formula wherein each R group is independently or simultaneously —O-$(C_1-C_{10})$alkyl or halo. In another embodiment, each R group is independently or simultaneously —O-$(C_1-C_6)$alkyl, F, Cl or Br. In a further embodiment, each R group is independently or simultaneously —O-$(C_1-C_3)$alkyl, F, Cl or Br. In another embodiment, each R group is independently or simultaneously —$OCH_3$, —$OCH_2CH_3$ or Cl.

In an embodiment of the disclosure, the tetrasilanol precursor compound has the formula In another embodiment, the tetrasilanol precursor compound has the formula In another embodiment of the disclosure, the trisilanol compound having an epoxy group has the formula wherein
W is -$(C_1-C_{10})$-alkylene, in which one or more carbon atoms are optionally replaced with an oxygen atom.

In another embodiment, W is -$(C_1-C_6)$-alkylene, in which one or more carbon atoms are optionally replaced with an oxygen atom. In a further embodiment, W is -$(C_5)$-alkylene, in which one or more carbon atoms are optionally replaced with an oxygen atom. In one embodiment of the disclosure, the trisilanol compound having an epoxy group has the formula

In another embodiment of the disclosure, the trisilanol compound having an epoxy group is formed from a precursor compound which, upon hydrolysis of the precursor compound, produces the trisilanol compound having an epoxy group. In one embodiment, the epoxy trisilanol precursor compound is any compound which hydrolyzes to a trisilanol compound carrying an epoxy group under suitable conditions. In one embodiment, the epoxy trisilanol precursor compound comprises alkoxy and/or halo substituents which hydrolyze to hydroxy moieties upon hydrolysis forming the trisilanol compound having an epoxy group.

In another embodiment of the disclosure, the epoxy trisilanol precursor compound has the formula wherein
each R' group is independently or simultaneously —O-($C_1$-$C_{10}$)alkyl or halo, and
W is -($C_1$-$C_{10}$)-alkylene, in which one or more carbon atoms are optionally replaced with an oxygen atom.

In one embodiment, each R' group is independently or simultaneously —O-($C_1$-$C_6$)alkyl, F, Cl or Br. In another embodiment, each R' group is independently or simultaneously —O-($C_1$-$C_3$)alkyl, F, Cl or Br. In a further embodiment, each R' group is methoxy or Cl. In one embodiment of the disclosure, the epoxy trisilanol precursor compound has the formula In another embodiment of the disclosure, the trisilanol compound having a thiol group has the formula wherein
V is -($C_1$-$C_{10}$)-alkylene.

In another embodiment, V is -($C_1$-$C_5$)-alkylene. In a further embodiment, V is -($C_1$-$C_3$)-alkylene. In one embodiment, the trisilanol compound having a thiol group has the formula In another embodiment of the disclosure, the trisilanol compound having a thiol group is formed from a precursor compound which, upon hydrolysis of the precursor compound, produces the trisilanol compound having a thiol group. In one embodiment, the thiol trisilanol precursor compound is any compound which hydrolyzes, under suitable conditions, to a trisilanol compound carrying a thiol group. In one embodiment, the thiol trisilanol precursor compound comprises alkoxy and/or halo substituents which hydrolyze to hydroxy moieties upon hydrolysis forming the trisilanol compound having an epoxy group.

In another embodiment of the disclosure, the thiol trisilanol precursor compound has the formula wherein
each R" group is independently or simultaneously —O-($C_1$-$C_{10}$)alkyl or halo, and
V is -($C_1$-$C_{10}$)-alkylene.

In one embodiment, each R" group is independently or simultaneously —O-($C_1$-$C_6$)alkyl, F, Cl or Br. In another embodiment, each R" group is independently or simultaneously —O-($C_1$-$C_3$)alkyl, F, Cl or Br. In another embodiment, each R" group is independently or simultaneously —O—$CH_3$ or Cl.

In another embodiment, V is -($C_1$-$C_5$)-alkylene. In a further embodiment, V is -($C_1$-$C_3$)-alkylene. In a further embodiment, the alkoxy silane having a thiol group has the formula

In one embodiment, the sol-gel material, comprises
a) a first colloidal sol-gel formed from:

a.i)

a.ii)

and
b) a second colloidal sol-gel formed from:

b.i)

b.ii)

wherein the thiol groups of the second colloidal sol-gel react with the epoxy groups of the first colloidal sol-gel to form the cross-linked sol-gel material.

In one embodiment, the sol-gel material, comprises
a) a first colloidal sol-gel formed from precursor compounds which hydrolyze under suitable conditions:

a.i)

a.ii)

and b) a second colloidal sol-gel formed from precursor compounds which hydrolyze under suitable conditions:

b.i) and b.ii)

wherein the thiol groups of the second colloidal sol-gel react with the epoxy groups of the first colloidal sol-gel to form the cross-linked sol-gel material.

The present disclosure also includes a sol-gel material as a coating composition for application to a metal substrate for protection against corrosion, the composition comprising
  a) a first aqueous dispersion comprising tetrasilanol and a trisilanol compound having an epoxy group to form a first colloidal sol-gel;
  b) a second aqueous dispersion comprising tetrasilanol and a trisilanol compound having a thiol group to form a second colloidal sol-gel;
wherein the first sol-gel and second sol-gel are cross-linked, and wherein the composition is for coating onto a corrosion-susceptible substrate to form a corrosion resistant protective coating thereon. The tetrasilanol, trisilanol compound having an epoxy group and trisilanol compound having a thiol group are as defined in any of the preceding paragraphs.

The present disclosure also includes a sol-gel material as a coating composition for application to a metal substrate for protection against corrosion, the composition comprising
  a) a first aqueous dispersion comprising a tetrasilanol precursor compound and an epoxy trisilanol precursor compound and an acid catalyst, to form a first colloidal sol-gel;
  b) a second aqueous dispersion comprising a tetrasilanol precursor compound and a thiol trisilanol precursor compound and an acid catalyst to form a second colloidal sol-gel;
wherein the first sol-gel and second sol-gel are cross-linked, and wherein the composition is for coating onto a corrosion-susceptible substrate to form a corrosion resistant protective coating thereon. The tetrasilanol, trisilanol compound having an epoxy group and trisilanol compound having a thiol group are as defined in any of the preceding paragraphs.

In another embodiment, there is also included a process of preparing a corrosion resistant protective coating on a corrosion susceptible substrate, which comprises:
  a) forming a first aqueous dispersion comprising tetrasilanol and a trisilanol compound having an epoxy group and polymerizing by a sol-gel process to form a first colloidal sol-gel;
  b) forming a second aqueous dispersion comprising tetrasilanol and a trisilanol compound having a thiol group and polymerizing by a sol-gel process to form a second colloidal sol-gel;
  c) cross-linking the first and second sol-gels by mixing each sol-gel to form a sol-gel material and applying the sol-gel material to the corrosion susceptible substrate.

The tetrasilanol, trisilanol compound having an epoxy group and trisilanol compound having a thiol group are all as defined in any of the preceding paragraphs.

In another embodiment, there is also included a process of preparing a corrosion resistant protective coating on a corrosion susceptible substrate, which comprises:
  a) forming a first aqueous dispersion comprising a tetrasilanol precursor compound and an epoxy trisilanol precursor compound and hydrolyzing and polymerizing by a sol-gel process to form a first colloidal sol-gel;
  b) forming a second aqueous dispersion comprising a tetrasilanol precursor compound and a thiol trisilanol precursor compound and hydrolyzing and polymerizing by a sol-gel process to form a second colloidal sol-gel;
  c) cross-linking the first and second sol-gels by mixing each sol-gel to form a sol-gel material and applying the sol-gel material to the corrosion susceptible substrate.

The tetrasilanol precursor compound, epoxy trisilanol precursor compound and thiol trisilanol precursor compound are all as defined in any of the preceding paragraphs.

In another embodiment of the disclosure, there is also included a kit comprising:
  a) a first container having disposed therein a first colloidal sol-gel as defined in any of the preceding paragraphs;
  b) a second container having disposed therein a second colloidal sol-gel as defined in any of the preceding paragraphs, and optionally, a surfactant (for example Flourad®);
  c) optionally, instructions for cross-linking the first colloidal sol-gel with the second colloidal sol-gel to obtain a sol-gel material as defined in any of the preceding paragraphs.

In one embodiment, the contents of the first container are mixed with the contents of the second container, to form the cross-linked sol-gel. In a further embodiment, the sol-gel material is applied to a metal substrate.

In one embodiment, the substrate is a corrosion susceptible substrate, such as a metal substrate. In one embodiment, the metal substrate is a steel substrate, an aluminum substrate, or alloy thereof. Examples of metal substrates include, but are not limited to, aircraft body, ship deck, ship hull, automotive body or component, fasteners such as screws, nails, bolts, nuts, or other structural materials, such as steel beams and trim materials such as window frames and door frames.

In one embodiment, the sol-gel material of the present disclosure is prepared and then coated onto the substrate. In another embodiment, the first sol-gel and second sol-gel are coated on the substrate separately, wherein the sol-gel material is formed (cross-linked) in situ on the substrate.

The present disclosure also includes a laminate article comprising a substrate coated with a sol-gel material as defined in any of the preceding paragraphs. In one embodiment, the laminate article comprises a metal substrate, such as a corrosion-susceptible metal substrate coated by the sol-gel as defined in any preceding paragraph. In one embodiment, the laminate article is an aircraft body, ship deck, ship hull, automotive body or component, fasteners such as screws, nails, bolts, nuts, or other structural materials, such as steel beams and trim materials such as window frames and door frames.

In one embodiment, prior to being coated with the sol-gel material, the substrate is treated with one of the first colloidal sol-gel or the second colloidal sol-gel.

(III) Processes for Forming Sol-Gel Material

The present disclosure also includes a process for forming a sol-gel material as defined herein. In one embodiment, there is included a process for preparing a sol-gel material, comprising
(i) preparing a first colloidal sol-gel by contacting a first tetrasilanol precursor with an epoxy trisilanol precursor compound in the presence of an acid catalyst;
(ii) preparing a second colloidal sol-gel by contacting a second tetrasilanol precursor with a thiol trisilanol precursor compound in the presence of a second acid catalyst; and
(iii) contacting the first colloidal sol-gel with the second colloidal sol-gel, optionally in the presence of a surfactant, to cross-link the sol-gels and form the sol-gel material.

In one embodiment, and without being bound by theory, the tetrasilanol precursor and the epoxy trisilanol precursor compound form polymeric colloids by a series of hydrolysis and condensation reactions resulting in a siloxane colloid (first sol-gel). For example, as shown in Scheme 1, the precursor compounds undergo hydrolysis to form the silanol derivatives:

Scheme 1

Tetrasilanol precursor compound    Tetrasilanol

Epoxy trisilanol precursor compound    Trisilanol having an epoxy group

As shown in Scheme 2 in one embodiment, the tetrasilanol and the trisilanol compound having an epoxy group condense to form a colloidal sol-gel.

Scheme 2

-continued

In one embodiment, the reactive epoxy functionalities remain after the sol-gel (polymerization) process, and are therefore available for cross-linking with the reactive thiol functionalities of the second sol-gel. In one embodiment, the by-products of the reaction are the variable R groups (R, R', R") from the precursor compounds which are produced as a result of the hydrolysis and condensation reactions. For example, a sol-gel process utilizing tetraethyl-orthosilicate (TEOS) as the tetrasilanol precursor results in ethanol as a by-product as a result of the hydrolysis of the ethoxy substituent.

In one embodiment, the first sol-gel is prepared by mixing an epoxy trisilanol precursor compound with a tetrasilanol precursor compound in a molar ratio of between about 1:1 to about 10:1, optionally about 1:1 to about 5:1, or about 3:1. In one embodiment, the components are mixed beforehand and added to a solution of an acid catalyst, for example, acetic acid, optionally at room temperature, to obtain the first sol-gel. In one embodiment, the acid catalyst is acetic acid.

In another embodiment, the second sol-gel is prepared by mixing a thiol trisilanol precursor compound with a tetrasilanol precursor compound in a molar ratio of between about 1:1 to about 10:1, optionally about 1:1 to about 5:1, or about 3:1. In one embodiment, the components are mixed beforehand and added to a solution of an acid catalyst, for example, acetic acid, optionally at room temperature, to obtain the second sol-gel. In one embodiment, the acid catalyst is acetic acid.

In another embodiment, the sol-gel material is prepared by mixing the first and second sol-gels which cross-links the sol-gels by reaction between the epoxy and thiol functionalities. In one embodiment, the second sol-gel is mixed with the first sol-gel in a molar ratio of between about 5:1 to about 1:1, optionally about 3:1 to about 1:1, or about 2:1. In one embodiment, the first and second sol-gels are mixed in the presence of a surfactant, for example, a 0.1% w/v Flourad® solution. In one embodiment, the cross-linking reaction to prepare the sol-gel material is carried out at room temperature.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In addition, citation or identification of any reference in this application shall not be construed as an admission that such reference is available as prior art to the present disclosure.

The operation of the disclosure is illustrated by the following representative examples. As is apparent to those skilled in the art, many of the details of the examples may be changed while still practicing the disclosure described herein.

EXAMPLES

Abbreviations
MPTMS—3-mercaptopropyltrimethoxysilane.
GPTMS—3-glycidoxypropyltrimethoxysilane.
APTMS—aminopropyltrimethoxysilane.
TEOS—tetraethyl orthosilicate.
MT—a combination of MPTMS and TEOS.
GT—a combination of GPTMS and TEOS.
TGST—combination of a MT and GT.

Example 1: Sol-Gel Preparation

Three different sol-gels were used to create the coatings:
(i) a 3:1 GPTMS/TEOS sol-gel (GT),
(ii) a 3:1 APTMS/TEOS sol-gel, and
(iii) a 3:1 MPTMS/TEOS sol-gel (MT).

The 3:1 GPTMS/TEOS sol-gel was produced by dropwise addition of 14.20 mL (0.06 mol) GPTMS and 4.48 mL (0.02 mol) TEOS into 21.60 mL 0.05M acetic acid. The final mixture was allowed to cure in a covered container for 72 hours before cross-linking. The 3:1 APTMS/TEOS recipe was produced in a similar manner by the dropwise addition of 11.08 mL APTMS (0.06 mol) and 4.48 mL (0.02 mol) TEOS into 21.60 mL 0.05M acetic acid which, when mixed fully, was allowed to cure for 72 hours in a closed container. The 3:1 MPTMS/TEOS sol-gel was produced by the dropwise addition 11.08 mL MPTMS (0.06 mol) and 4.48 mL (0.02 mol) TEOS into 21.60 mL 0.05M acetic acid. This sol-gel was made 24 hours before cross-linking to prevent formation of a precipitate.

Example 2: Substrate Preparation

Aluminum 2024 and low carbon steel were used to test the anti-corrosion coatings of the disclosure. The substrates were cut into 1 inch by 3 inch slides. Prior to applying the sol-gel coating, the substrates were cleaned and surface treated. For cleaning, the steel slides were sonicated in acetone for five minutes, rinsed with Millipore water, then immersed into a 25% hydrochloric acid solution, rinsed again using Millipore water and finally blow-dried. The aluminum slides were sonicated in acetone for five minutes, rinsed with Millipore water, immersed in a solution of 1:1 v/v concentrated nitric and acetic acids for 15 minutes, rinsed in Millipore water and blow-dried. After cleaning, the slides were immersed in a surface treatment solution for 20 minutes. The surface treatment was made by adding 14.73 mL of GPTMS to 120 mL of 0.05 M acetic acid while stirring. The mixture was then allowed to stir for a further 30 minutes. After surface treatment, the slides were hung until dry.

Example 3: Cross-Linking and Substrate Preparation

To create the GPTMS/EDA cross-linked coating, 25 mL GPTMS/TEOS (GT) solution was added to 1.08 mL EDA, 1.08 mL Millipore water and 20.0 mL of a 0.1% w/v Flourad (surfactant) solution. Six steel and six aluminum surface treated slides were then dip-coated three times with 15 second intervals between dips and then were allowed to air dry. The GPTMS/APTMS cross-linked coating was made using the APTMS/TEOS sol-gel and the GPTMS/TEOS (GT) sol-gel in a 2:1 ratio with 4.0 mL of 0.1% Flourad solution being added to the APTMS/TEOS sol-gel before the solutions were combined. Six steel and six aluminum surface treated slides were then dip-coated three times with 15 second intervals between dips and then were allowed to air dry. Finally, to make the GPTMS/MPTMS (TGST) coating, 4.0 mL of 0.1% Flourad solution was added to the MPTMS/TEOS (MT) sol-gel which was then combined with the GPTMS/TEOS (GT) sol-gel in a 2:1 ratio. Six steel and six aluminum surface treated slides were then dip-coated three times with 15 second intervals between dips and then were allowed to air dry.

When the sol-gel coating had dried on all slides, black electrical tape was used to tape the perimeter of the dipped area outlining observation boundaries. This procedure removes from the study area the build up of sol-gel at the bottom of the slide. Three slides of each of the different coatings on both substrates were then scribed with a 2.5 cm scribe diagonally through the observation area ensuring that some of the substrate was exposed.

Example 4: Anti-Corrosion Properties

All slides were immersed in dilute Harrison's solution for the duration of the experiment. Dilute Harrison's solution is composed of 3.5 g ammonium sulphate and 0.5 g sodium chloride dissolved in 1.0 L of water and is a standard testing situation for metal corrosion. An image scanner was used to observe the slides. Scans of the aluminum and steel slides were taken before they were immersed and written observations were taken of the steel slides every 30 minutes for two hours and after two hours a scan was taken of the slides. Scans of both slides were taken every 48 hours for a week, then a week later and final observations for the steel slides were taken a month later.

The corrosion properties of the aluminum and steel substrates are significantly different resulting in different timeframes for the study of these properties. At the beginning of the study all slides were clear of corrosion and other marks.

Steel

Figure 1:
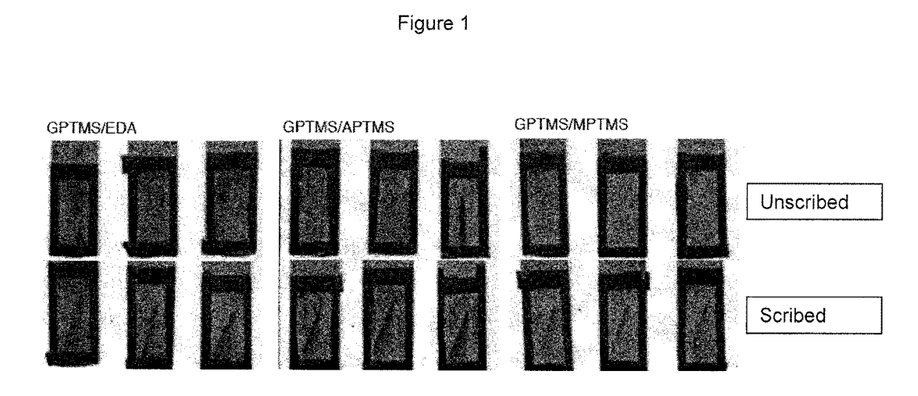
FIG. 1 is a photo of various steel substrates treated with a sol-gel material of the disclosure and immersed in a solution for testing metal corrosion.

The samples on steel substrates began to show corrosion on the scribed slides after 30 minutes of immersion, while the first significant signs of corrosion on the unscribed steel slides were not recorded until 24 hours after immersion. Within the first 3 hours of study, all of the scribed slides appeared to be corroding at similar rates with all corrosion confined to the scribe line. However, after 24 hours, both the slide set with the GPTMS/EDA coating and the set with the GPTMS/APTMS coating showed corrosion outside of the scribe line while corrosion on the slides with a GPTMS/MPTMS (TGST) coating was still confined to the scribe line. After 24 hours the unscribed GPTMS/MPTMS (TGST) coated slides were also performing much better than the unscribed slides with the other cross-linked coatings. The GPTMS/MPTMS (TGST) coating continued to show the best performance throughout the remainder of the study. For this study, a significant observation point was after 48 hours where the performance of the GPTMS/MPTMS (TGST) cross-linked sol-gel coating is evident in which very little corrosion appears (FIG. 1).

Aluminum

Figure 2:
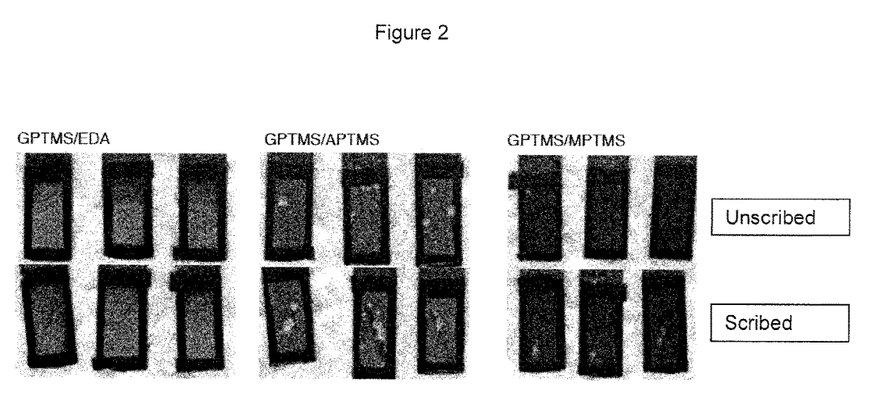
FIG. 2 is a photo of various aluminum substrates treated with a sol-gel material of the disclosure and immersed in a solution for testing metal corrosion.

The studies on aluminum substrates will be observed over a longer period of time than the steel because aluminum naturally corrodes at a slower rate than steel. The first signs of corrosion on the scribed slides appeared in an observation 24 hours after immersion while corrosion on the unscribed slides did not appear until 48 hours after immersion when pinpoint corrosion was observed. After 48 hours, the GPTMS/MPTMS (TGST) coatings continued to successfully protect their substrate. After 30 days of immersion, significant aluminum corrosion product build-up was observed on the GPTMS/APTMS slides. No evidence of corrosion was observed for the GPTMS/MPTMS (TGST) coating (FIG. 2).

The results of this study have shown that a GPTMS/MPTMS (TGST) cross-linked sol-gel coating on metal substrates provides significant protection against corrosion when compared to a GPTMS/EDA or a GPTMS/APTMS cross-linked sol-gel.

Example 5: Varying Ratios of the Colloids

Figure 3:
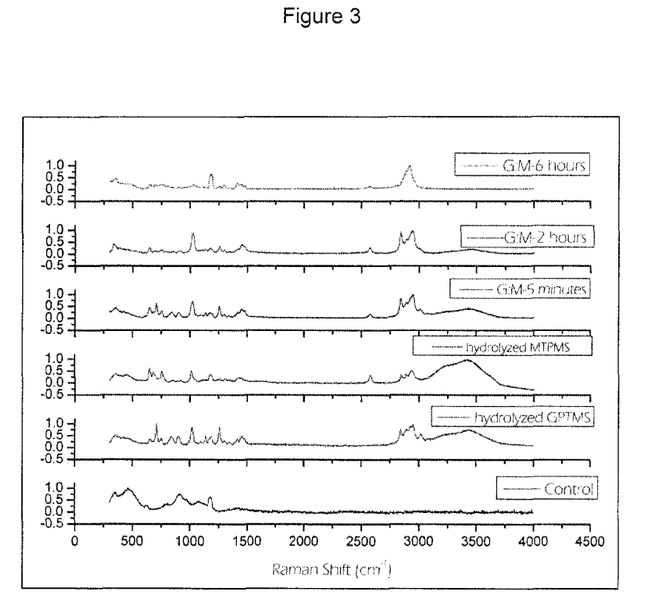
FIG. 3 shows a series of Raman spectra of the cross-linking reaction of a sol-gel material over time.

When a 1:1 ratio of MT (3:1 MPTMS:TEOS) and GT (3:1 GPTM:TEOS) is combined, cross-linking occurs. As shown in FIG. 3, a series of Raman spectra demonstrates the cross-linking process over a course of 6 hours. The series of spectra from bottom to top include the acetic acid control, hydrolyzed GPTMS and MPTMS silanols, TGST after 5 minutes of cross-linking, 2 hours of cross-linking and 6 hours of cross-linking respectively. Each spectrum was normalized to the 1256 cm$^{-1}$ epoxide ring breathing mode. The spectra indicate that the thiol S—H stretch at 2580 cm$^{-1}$ is present but changes in intensity over the course of cross-linking time. Qualitative observations were also recorded over the course of 24 hours when the silanes were added to each other. Over time the MPTMS-GPTMS (TGST) (two originally colourless liquids) cross-linking reaction showed an increasing intensity in a yellow colour.

Figure 4:
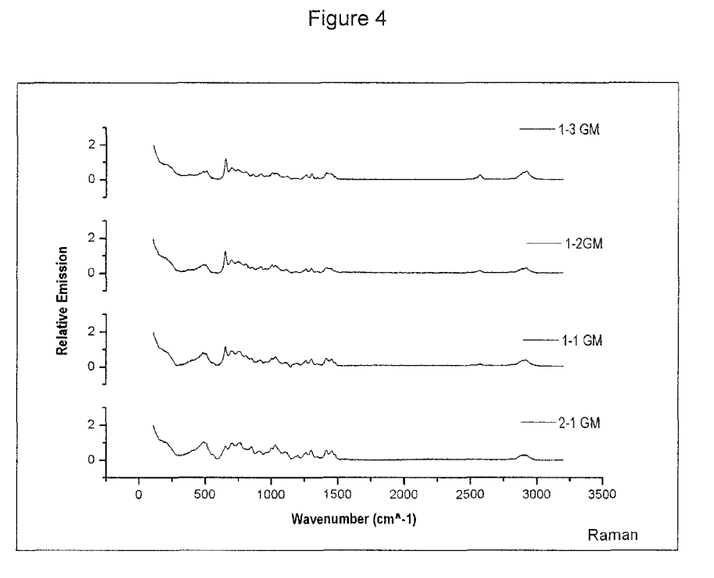
FIG. 4 shows a series of Raman spectra of sol-materials formed at different molar ratios.
Figure 5:
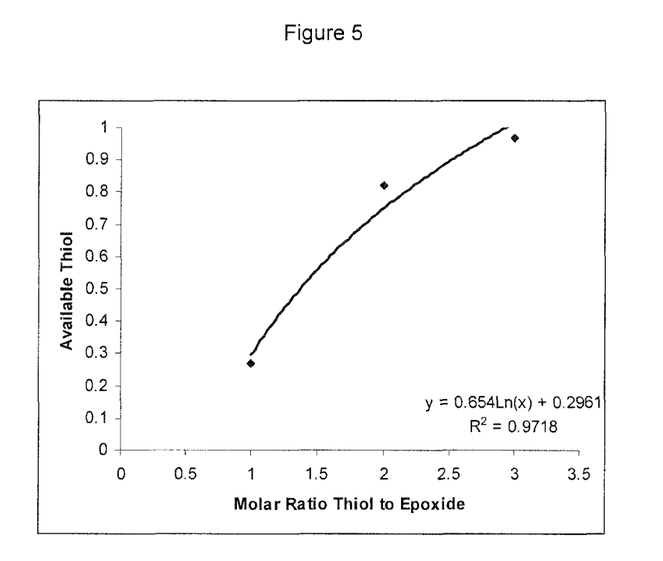
FIG. 5 is a graph showing the amount of available thiols in a sol-gel material.

Varying the molar ratios between GPTMS (GT) and MPTMS (MT) was also examined. Using MT and GT silane mixtures, the performance between GPTMS:MPTMS at ratios of 2:1, 1:1, 1:2 and 1:3 was observed. Again, using Raman spectroscopy, FIG. 4 demonstrates that the thiol S—H stretch varies with the molar ratios, which supports the cross-linking by the epoxide ring from the GPTMS (GT) opening from the thiols in the MPTMS (MT). The TGST gels even in a 1:1 GPTMS:MPTMS (TGST) molar ratio still have available thiols for use in further functionalization and corrosion protection. Using peak integration from the Raman spectra in FIG. 4, the percentage amount of available thiols in the coatings was quantitatively determined. FIG. 5 shows that there are available thiols at 2:1 and 3:1 MPTMS:GPTMS (TGST) molar ratios. A 2:1 MPTMS:GPTMS (TGST) coating provided sufficient cross-linking to create a durable coating (delamination and cracking free) with corrosion protection capabilities.

Example 6: Surface Treatment Protocol 6.3 mL of MPTMS was added dropwise to 120 mL of 0.05M acetic acid under continuous stirring. The solution was stirred for a total of 30 minutes prior to substrate immersion for surface treatment. 2 mL of 0.1% w/w Fluorad was then carefully added to solution. Glass slides were placed in this solution for 120 minutes and then removed. Following surface treatment, the slides were hung to dry overnight. The following day they were dip coated with a given TGST formulation.

Figure 6:
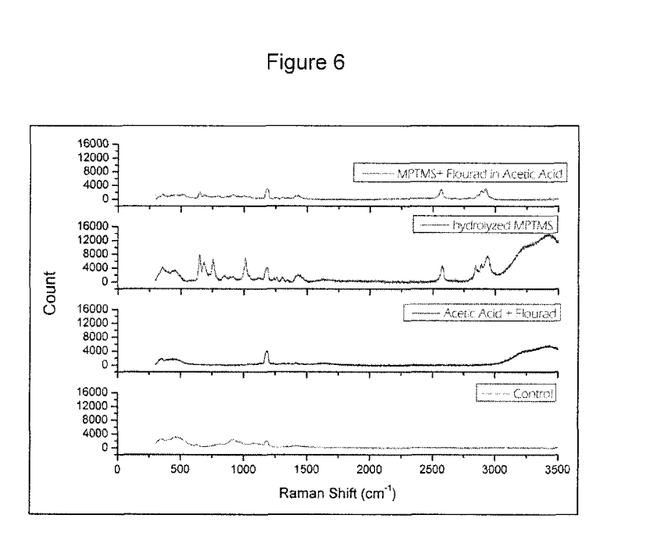
FIG. 6 shows a series of Raman spectra of a surface treatment protocol after each step.

Raman spectroscopy was used to assess the functionality of the surface treatment protocol on the glass substrates. From bottom to top in FIG. 6, the series of spectra include (i) the control of the glass slide, (ii) after immersion in acetic acid and Flourad, (iii) just hydrolyzed MPTMS and, (iv) immersion in all three components FIG. 6 demonstrates that the thiol S—H stretch at 2580 cm$^{-1}$ is present and available for further cross-linking when the glass slides are surface treated with the described solution.

The invention claimed is:
1. A sol-gel material, comprising:
   a) a first colloidal sol-gel formed from:
      i) tetrasilanol, and
      ii) a trisilanol compound having an epoxy group;
   b) a second colloidal sol-gel formed from:
      iii) tetrasilanol, and
      iv) a trisilanol compound having a thiol group,
wherein the first colloidal sol-gel is cross-linked to the second colloidal sol-gel.

2. The sol-gel material of claim 1, wherein the tetrasilanol is formed from a tetrasilanol precursor compound.

3. The sol-gel material of claim 2, wherein the tetrasilanol precursor compound has the formula wherein each R group is independently or simultaneously —O-(C$_1$-C$_{10}$)alkyl or halo.

4. The sol-gel material of claim 3, wherein the tetrasilanol precursor compound has the formula 5. The sol-gel material according to claim 1, wherein the trisilanol compound having an epoxy group has the formula wherein
W is -(C$_1$-C$_{10}$)-alkylene, in which one or more carbon atoms are optionally replaced with an oxygen atom.

6. The sol-gel material according to claim 5, wherein the trisilanol compound having an epoxy group has the formula 7. The sol-gel material according to claim 1, wherein the trisilanol compound having an epoxy group is formed from an epoxy trisilanol precursor compound.

8. The sol-gel material according to claim 7, wherein the epoxy trisilanol precursor compound has the formula wherein
each R' group is independently or simultaneously —O-(C$_1$-C$_{10}$)alkyl or halo, and
W is -(C$_1$-C$_{10}$)-alkylene, in which one or more carbon atoms are optionally replaced with an oxygen atom.

9. The sol-gel material according to claim 8, wherein each R' group is independently or simultaneously —O—CH$_3$ or Cl.

10. The sol-gel material according to claim 9, wherein the epoxy trisilanol precursor compound has the formula 11. The sol-gel material according to claim 1, wherein the trisilanol compound having a thiol group has the formula wherein
V is -(C$_1$-C$_{10}$)-alkylene.

12. The sol-gel material according to claim 11, wherein the trisilanol compound having a thiol group has the formula 13. The sol-gel material according to claim 1, wherein the trisilanol compound having a thiol group is formed from a thiol trisilanol precursor compound.

14. The sol-gel material according to claim 13, wherein the thiol trisilanol precursor compound has the formula wherein
each R″ group is independently or simultaneously —O-($C_1$-$C_{10}$)alkyl or halo, and
V is -($C_1$-$C_{10}$)-alkylene.

15. The sol-gel material according to claim 14, wherein each R″ group is independently or simultaneously —O—$CH_3$ or Cl.

16. The sol-gel material according to claim 14, wherein V is -($C_1$-$C_3$)-alkylene.

17. The sol-gel material according to claim 14, wherein the thiol trisilanol precursor compound has the formula 18. The sol-gel material according to claim 1, wherein sol-gel material comprises
a) a first colloidal sol-gel formed from:

a.i)

a.ii)

and
b) a second colloidal sol-gel formed from:

b.i)

b.ii)

wherein the thiol groups of the second colloidal sol-gel react with the epoxy groups of the first colloidal sol-gel to form the sol-gel material.

19. A method for preparing a sol-gel material, comprising
preparing a first colloidal sol-gel by contacting a tetrasilanol precursor compound with an epoxy trisilanol precursor compound in the presence of an acid catalyst;
preparing a second colloidal sol-gel by contacting a tetrasilanol precursor compound with a thiol trisilanol precursor compound in the presence of a second acid catalyst; and
contacting the first colloidal sol-gel with the second colloidal sol-gel to cross-link the first and second colloidal sol-gels to form the sol-gel material.

20. A process of preparing a corrosion resistant protective coating on a corrosion susceptible substrate, which comprises:
a) forming a first aqueous dispersion of tetrasilanol and a trisilanol compound having an epoxy group and polymerizing by a sol-gel process to form a first sol-gel;
b) forming a second aqueous dispersion of tetrasilanol and a trisilanol compound having a thiol group and polymerizing by a sol-gel process to form a second sol-gel;
c) cross-linking the first and second sol-gels by mixing each sol-gel to form a sol-gel material and applying to the corrosion susceptible substrate.

* * * * *